United States Patent [19]

Lumelsky et al.

[11] Patent Number: 4,823,286

[45] Date of Patent: Apr. 18, 1989

[54] PIXEL DATA PATH FOR HIGH PERFORMANCE RASTER DISPLAYS WITH ALL-POINT-ADDRESSABLE FRAME BUFFERS

[75] Inventors: Leon Lumelsky, Stamford, Conn.; Joe C. St. Clair, Round Rock; Robert L. Mansfield, Austin, both of Tex.; Marc Segre, Rhinebeck, N.Y.; Alexander K. Spencer, Austin, Tex.

[73] Assignee: International Business Machines Corporation, Armonk, N.Y.

[21] Appl. No.: 13,847

[22] Filed: Feb. 12, 1987

[51] Int. Cl.[4] .............................................. G06F 12/06

[52] U.S. Cl. ...................................... 364/521; 364/518

[58] Field of Search ... 364/518, 521, 522, 200 MS File, 364/900 MS File; 340/747, 750, 799

[56] References Cited

U.S. PATENT DOCUMENTS

| | | | |
|---|---|---|---|
| 4,434,502 | 2/1984 | Arakawa et al. | 382/41 |
| 4,442,503 | 4/1984 | Schutt et al. | 364/900 |
| 4,635,049 | 1/1987 | Dodge et al. | 340/747 X |
| 4,663,619 | 5/1987 | Staggs et al. | 340/799 X |
| 4,667,305 | 5/1987 | Dill et al. | 340/799 X |
| 4,691,295 | 9/1987 | Erwin et al. | 364/521 X |
| 4,742,474 | 5/1988 | Knierim | 364/521 |

*Primary Examiner*—Gary V. Harkcom
*Assistant Examiner*—Mark K. Zimmerman
*Attorney, Agent, or Firm*—Roy R. Schlemmer, Jr.

[57] ABSTRACT

A multichannel data path architecture which assists a host processor in communication with the frame buffer in order to increase the overall system performance. The architecture provides automatic frame buffer data path rearrangement depending on the pixel address and the host data interpretation. It utilizes a minimum of shift registers, accumulators and control circuitry to provide the requisite storage, reconfiguration and frame buffer access functions. The architecture extends bit-blt (bit block transfer) conventional operations in order to provide high quality "antialiased" text and graphics directly in the architecture without requiring the calculation of colors by the host processor. Finally, it assists the "burst" mode update of an arbitrary single plane of a frame buffer, which is especially important when high denisty chips are used for the frame buffer implemenation.

14 Claims, 14 Drawing Sheets

PLANE MODE

SLICE MODE

PIXEL MODE

COMB UNIT OPERATION

PIXEL DATA PATH FOR HIGH PERFORMANCE RASTER DISPLAYS WITH ALL-POINT-ADDRESSABLE FRAME BUFFERS

CROSS REFERENCE TO RELATED COPENDING APPLICATIONS

U.S. patent application Ser. No. 7/013,842 filed Feb. 12, 1987 entitled "A HIGH RESOLUTION GRAPHICS DISPLAY ADAPTER" relates to an overall high function video display adapter, in which the architecture of the present invention has particular utility.

U.S. patent application Ser. No. 7/013,843 filed Feb. 12, 1987 entitled "A FRAME BUFFER CAPABLE OF ACCESSING ALIGNED SQUARE WORDS OF THE SCREEN" discloses a frame buffer architecture which permits a substantial increase in the speed of a number of display operations as well as enhancing the versatility of the adapter in terms of the functions that may be performed off line. The hardware of this application would be located in the "frame buffer" block of application Ser. No. 7/013,842.

U.S. patent application Ser. No. 7/013,848 filed Feb. 12, 1987 entitled "VECTOR GENERATOR WITH DIRECTION INDEPENDENT DRAWING SPEED FOR AN ALL-POINT ADDRESSABLE RASTER DISPLAY" discloses a novel vector line drawing circuit for use with raster scan type video displays and having both improved speed and versatility of function.

U.S. patent application Ser. No. 7/013,841filed Feb. 12, 1987 entitled "A GRAPHICS DISPLAY SYSTEM FUNCTION CIRCUIT" discloses a graphics function address counter circuit similar to that set forth herein which is uniquely suited to the overall video display adapter architecture set forth in the above referenced application Ser. No. 7/013,842. The hardware of this application would be located within the "pixel processor" block of Application Ser. No. 7/013,842.

U.S. patent application Ser. No. 7/013,840 filed Feb. 12, 1987 entitled "A GRAPHICS DISPLAY SYSTEM WITH MEMORY ARRAY ACCESS" discloses circuitry for performing certain functions in the "pixel processor" block of application Ser. No. 7/013,842. This application specifically relates to circuitry for controlling pixel data provided to the frame buffer of the video adapter and includes a controllable write mask used in storing pixel data in the associated frame buffer.

U.S. patent application Ser. No. 7/013,849 filed Feb. 12, 1987 entitled "A GRAPHICS FUNCTION CONTROLLER FOR A HIGH PERFORMANCE VIDEO DISPLAY SYSTEM" discloses circuitry for performing line drawing and bit block transfer operations in the "pixel processor" block of application Ser. No. 7/013,842.

FIELD OF THE INVENTION

The present invention relates generally to the field of display adapter for interfacing between a computer and an attached raster scan video display monitor. It relates more specifically to such an adapter which provides many functions previously unavailable to small micro and mini systems in a small inexpensive stand alone workstation.

The invention relates still more specifically to a data path architecture for such a video adapter having significant data manipulation capabilities which unburdens the system CPU and enhances the versatility of the adapter especially with respect to smaller systems having limited processing capabilities.

BACKGROUND OF THE INVENTION

As the speed and file capacity of workstations in personal computers increases, the demand for high resolution intelligent display adapters also increases. Large graphic applications formerly limited to mainframe computers having dedicated graphic display terminals can use this increased capability in the adapters to migrate their graphic applications to stand alone systems. The present invention describes functions that can be incorporated into a video display adapter to provide, in stand alone workstations, the graphic functions and performance required by such complex graphic applications.

Such increased capability display adapters are especially needed for such small stand alone systems as the IBM PC/AT and the IBM RT-PC which can provide high-performance, moderatecost adapter functions which cover a very broad spectrum of applications.

The principle role of the pixel data path is to provide a host processor with a convenient access to frame buffer date. There are several problems which usually are not solved fully by the existing approach to the architecture of such a data path.

The frame buffer architecture usually supports either the pixel or plane structure of an image. It means that the conventional architecture provides good performance only for a particular area of application.

Thus, for a pixel oriented architecture, (e.g., image processing applications) several pixels are conventionally accessed in parallel, but only the same number of bits in one plane can be processed. So, performance for plane oriented applications is usually low because the frame buffer I/O width can not be fully utilized.

For plane oriented systems (e.g., 2.5 D graphics) multi-bit data from the same plane can be easily accessed, but for applications, requiring pixel access, a number of memory cycles must be used to access a pixel.

The representation of data for the host processor depends on the application. Taking a 32-bit host processor, for example, a processor word can stand for four (8 bit) pixels for pixeloriented applications, or for 32 bits of the same plane for planeoriented problems or for a corresponding number of pixel "slices" for processing pixel data fields.

If the host data bus is "hard-wired" to a frame buffer, the host must rearrange words, placing bits in relation to the frame buffer I/O layout.

The conventional idea of the bit block transfer (bitblt) primitive, J. D. Foley, A. Van Dam, "FUNDAMENTALS OF INTERACTIVE COMPUTER GRAPHICS", Addison-Wesley, Reading, MA. 1982, pp. 465, 484–485, allows increased performance only for simple area copy or logical operations between planes. Briefly and simply stated this operation comprises the parallel access of the frame buffer to a plurality of contiguous pixels making up a block of video data. The operation speeds certain display operations. The incorporation of arithmetic operations into the bit-blt hardware has been tried but has generally proved useless for color graphics, so the processing of colors has usually been done by the host. But in the area of color graphics there is a very important application, specifically a fast antialiasing copy of characters or vectors, Paul N.

Sholtz, "MAKING HIGH-QUALITY COLORED IMAGES ON RASTER DISPLAYS", Research Report RC9632, available from the library of the IBM Thomas J. Watson Research Center, Yorktown Heights, New York 1982. This operation provides a very high quality of text (or graphics) on even a low resolution screen, and in the case of a restricted number of colors (e.g., 16 for background and 16 for characters) requires only simple and uniform arithmetic operations on pixel intensity and color attributes.

An all-point addressable frame buffer (such as described in copending Application Ser. No. 07/013,843 filed Feb. 12, 1987 requires a certain kind of data alignment, which is able to provide a proper order of bits in the accessed word independently of its address, Rober F. Sproull, Ivan E. Sutherland, Alistair Thompson, Satish Gupta, and Charles Minter, "THE 8 BY 8 DISPLAY", ACM Trans. Graphics, Vol. 2, No. 1, Jan. 1983, pp. 32–56.

The host processor may handle such an operation but in the time-consuming and application dependent manner. The present invention provides a special alignment unit which makes this alignment invisible for the user.

With the use of 1-Meg memory chips, now appearing on the market, the performance for plane-oriented operations may be reduced drastically due to the narrower frame buffer data width. E.g., with the use of 256 K chips (64K by 4), the data path may be 4 times wider than is the case with 1 Meg chips (256K by 4).

DESCRIPTION OF THE PRIOR ART

In addition to those references discussed previously in the Background of the Invention section of the specification, the following references constitute the closest art found in a prior art study and together with the references mentioned previously constitute the closet relevant prior art known to the inventors.

U.S. Pat. No. 4,434,502 of Arakawa et al, entitled "A MEMORY SYSTEM HANDLING A PLURALITY OF BITS AS A UNIT TO BE PROCESSED" and U.S. Pat. No. 4,442,503 of D. Schutt et al, entitled "DEVICE FOR STORING AND DISPLAYING GRAPHIC INFORMATION", both describe video frame buffer architectures having attached data paths or channels providing data to the buffers. The present invention distinguishes over these two patents in a number of respects as set forth below.

Neither of these two patents deal with the extension of the bit-blt-conventional operations in order to provide high performance and high quality antialiased text or graphics.

The patents describe a frame buffer which can be accessed conveniently only by planes. In order to access a pixel, all planes must be read in parallel. On the next step, an external device (e.g., a microprocessor) can rearrange bits that are read from the frame buffer in order to provide arithmetic operations on pixel values. The present invention provides a simple rearrangement of the frame buffer data path, modifying it in a way which is convenient both for arithmetic operations on pixel values as well as logical operations on bit values.

Neither patent is concerned with larger density memory chips. Quite the opposite, smaller density chips can better be used for building separate frame buffer modules. Therefore, data alignment must be done separately for each module depending on the address supplied to the particular module.

Quite the opposite approach is taken by the present invention. It considers the frame buffer as a single block. So all data rearrangement is done in the same simple manner for all input-output bits of the frame buffer. Consequently, it simplifies the hardware required for bit rearrangement.

Besides the bit rearrangement for all-point addressability, in the present invention an additional rearrangement of the input/output interface is done. It provides a convenient interface with an external microprocessor, based on an application's requirements. It means, that from the point of view of the microprocessor, the frame buffer it may be made to look like it is organized plane-wise, or pixel-wise or slice-wise. In cases where the frame buffer is being used for an application where the pixel or slice access is more important, than the bit-wise access, it provides much higher performance by reducing the external processor's overhead.

The present invention teaches an economical way of organizing a data path for those cases where high density memory chips are used (e.g., 1 Megabit) and consequently only a small number of input/output lines is available. Neither of these two patents discuss this, because the use of the large density chips in the manner described in the patents leads to a substantial waste of storage capacity.

As a result, the solutions taught by the present invention are more suitable for VLSI design, than the approach of either U.S. Pat. Nos. 4,434,502 or 4,442,5023 provide higher performance for a wider class of applications and may be successfully used with contemporary high density memory chips.

Copending U.S. patent application Ser. No. 06/616,047 of Dill et al, entitled "DISPLAY ARCHITECTURE HAVING VARIABLE DATA WIDTH" is concerned for the 'on chip' bit rearrangement in memory chips, mostly with the purpose of aligning data fields in cases where horizontal resolution is not a number which is a power of 2. This is irrelevant to the present invention, which deals with the external bit rearrangement for conventional memory chips.

SUMMARY AND OBJECTS

It is a primary object of the present invention to provide a data path architecture which greatly improves the versatility of a vector display adapter by performing operations which would otherwise have to be performed by a host processor.

It is a further object to provide such a data path architecture which allows selective operation in an attached all-pointsaddressable (APA) frame buffer which may be performed on:

(1) multiple pixels (2) multiple pixel slices (3) or on a single plane bit position in multiple pixels It is another object of the invention to provide such a data path architecture which allows for the above operation in such an APA frame buffer where array access of pixels is possible.

It is yet another object of the present invention to provide such a data path architecture which allows the above operations in such an array accessible APA frame buffer where access is not limited to fixed predetermined boundaries on the display screen.

It is another object of the invention to provide such a data path architecture wherein the hardware accepts video data from the host processor and performs all of the rearranging of said data necessary to properly store same in the frame buffer with a minimum of interaction with said host processor.

It is another object of the invention to provide a preferred embodiment thereof a hardware design which minimizes the amount of accumulators, rotators and switching logic necessary to perform the requisite operations.

The objects of the herein described invention are accomplished in general by a pixel data path architecture which substantially increases the display system performance, facilities programming, and shortens control codes. The architecture organizes the data path to support the frame buffer in a way which conveniently handles both pixel or plane oriented areas of applications, fully utilizing data bus width. It further provides a host data word rearrangement for the most frequently encountered applications, releasing the host from this time-consuming operation.

The architecture includes a special hardware assists to the color antialiasing copy. It increases the performance of high quality text typing beyond requirements, that are sufficient for text processing applications and usually were available only for bilevel text.

The disclosed architecture, further, allows the storage of data inside the data path in a way that a single host word may be used for writing the same number of bits in one plane, accessing sequentially the corresponding number of pixels in any direction. Thus, page mode can be used in the horizontal direction, increasing the system performance for plane-oriented operations to an extent which was previously practical only with lower density memory chips.

DESCRIPTION OF THE PREFERRED EMBODIMENT

Before proceeding with a detailed description of the present Pixel Data Path Architecture for use with an all-points addressable frame buffer, a brief overview will be presented of a video adapter in which the present invention has particular utility. It is, of course, to be understood that the herein described video adapter is intended to be for illustration only and that the present invention could be used advantageously with other video adapter architectures as will be apparent to those skilled in the art.

Figure 1:
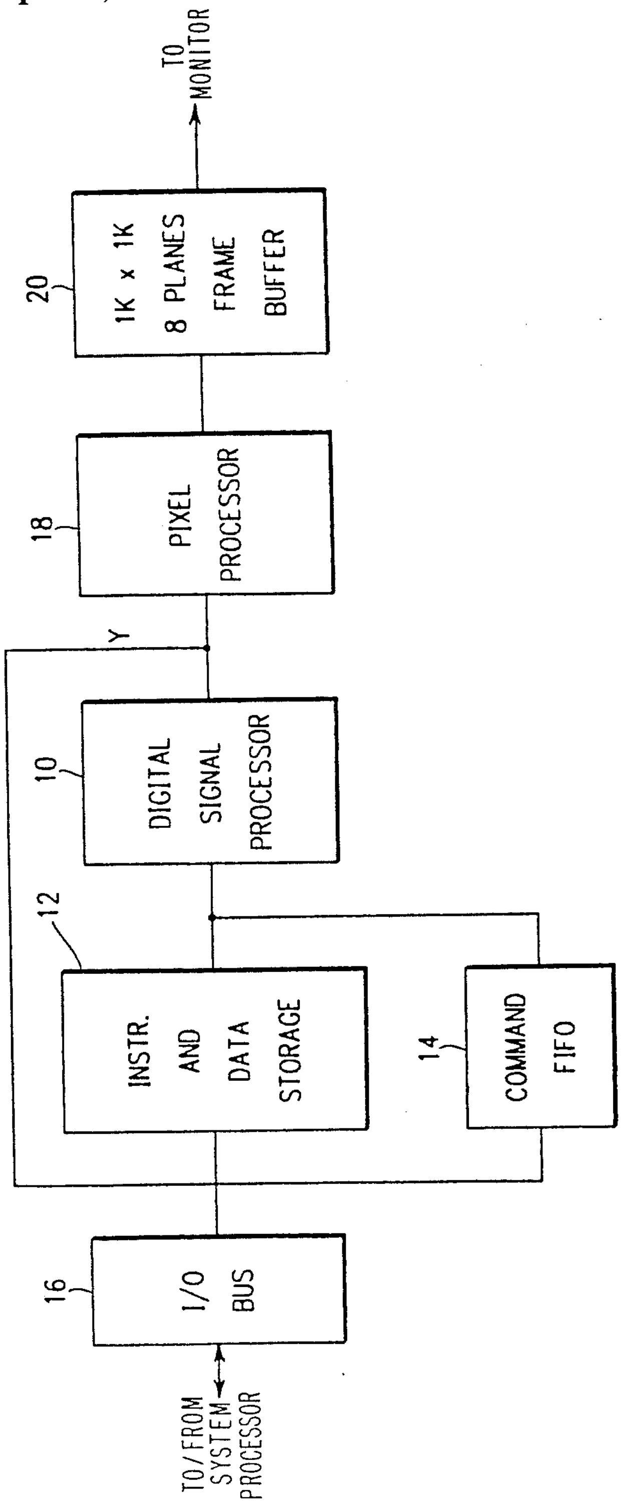
FIG. 1 comprises a high level functional block diagram illustrating the architecture of an overall video display adapter in which the data path architecture of the present invention has particular utility.

An overall functional block diagram of a video display adapter in which the present invention has particular utility is shown in the FIG. 1.

The video display adapter is envisioned as a high resolution, medium function graphics display adapter which could drive any of a number of currently available display monitor units such as the IBM 5081. In a currently realizable form, it will support such a monitor with a resolution of 1024 by 1024 pixels and provides eight bits per pixel of video data information which provides 256 possible control features which may be distributed between color and/or gray scale data.

The following comprises a brief description of the overall function of the adapter, it being understood that for a more detailed description of such an adapter, reference should be made to copending Application Ser. No. 7/013,842. Since the primary objective of the overall video display adapter is to provide advanced video display functions in a comparatively inexpensive adapter which is, in turn, adapted to be connected to processors or CPU's having somewhat limited processing capability, those functions which would otherwise be performable in a more sophisticated CPU are provided in the present adapter. Further, the functions are implementable via a relatively straighforward and simplified set of instructions.

Referring to FIG. 1, the overall adapter consists of the following major components. The digital signal processor 10 is utilized to manage the overall adapter's resources and it transforms display coordinates and performs a number of other fairly sophisticated signal processing tasks.

The instruction and data storage block 12 is an instruction RAM which can be loaded with additional micro code for signal processor as will be understood. Block 12 also acts as a data RAM and provides the primary interface between signal processor 10 and the system processor. It also performs the function of being a main store for the signal processor 10.

Block 14, labeled command FIFO, serves as an input buffer for passing sequential commands to the digital signal processor 10 via I/O bus 16 and, as is apparent, connects the video display adapter to the system processor.

The pixel processor 18 contains logic that performs a number of display supporting functions such as line drawing and address manipulation which permits finite areas of the display screen to be manipulated (bit-blt). A number of the novel aspects of the present display adapter are resident in the pixel processor block. Bock 20, labeled frame buffer, comprises the video random access memory which feeds the monitor through appropriate digital/analog conversion circuitry. As is apparent, the configuration herein disclosed has a resolution of approximately 1K by 1K pixels wherein each pixel represents a discrete element of video data to be displayed on the monitor. Each pixel may contain as much information as is storable in the eight planes of the frame buffer which, is as well understood, means that there are eight bits of data per pixel. As will further be understood, these eight bits may be distributed among the red, green and blue of a color monitor or simply for intensity information in a gray scale black and white monitor.

The subject matter of the present invention is resident in the architecture of the pixel processor 18 and provides a number of features which permit the operation of the video adapter to be significantly speeded up as will be apparent from the subsequent description.

Referring now to the details of the present embodiment, let it be assumed, that the 8-bit fame buffer with the resolution 1K by 1K has a four-in-line (pixel) all-point addressable access.

Figure 2:
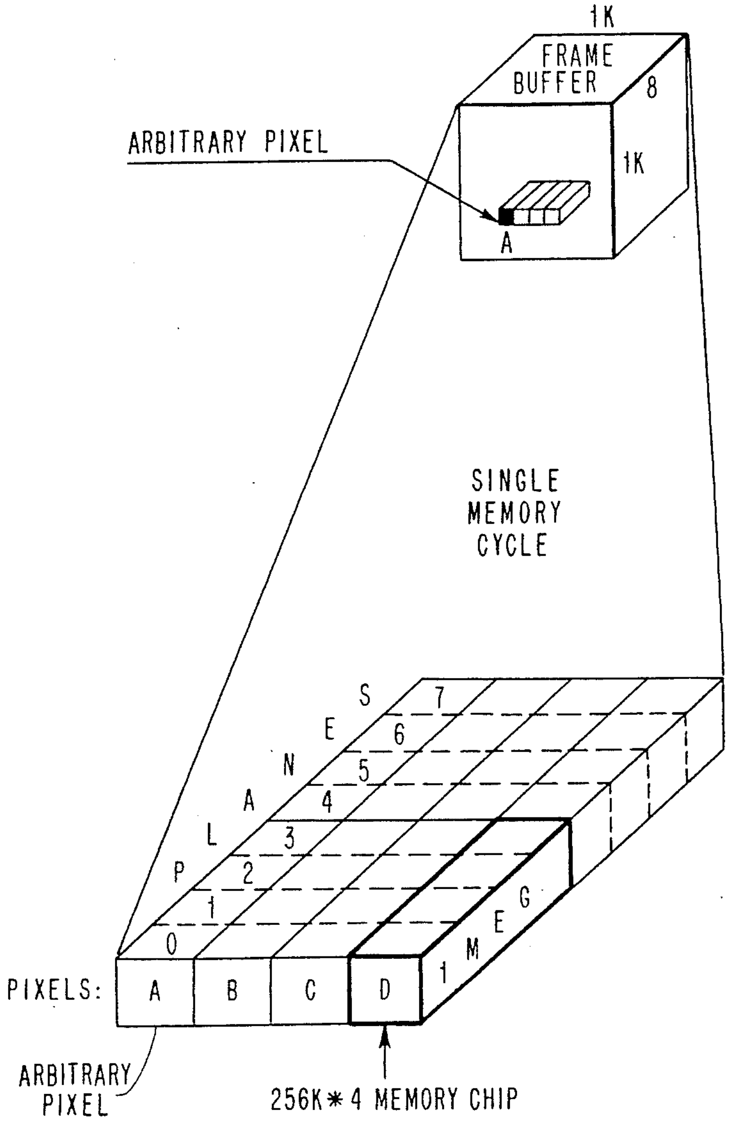
FIG. 2 illustrates the organization of the memory chips in the frame buffer and further defines the labeling of individual pixels as they would appear on the display screen.

Such a frame buffer could be constructed of eight 256K by 4 memory chips, as shown in FIG. 2. The frame buffer I/O data is 32 bit in width and provides read/write operation for 4 pixels in parallel, although it will be readily appreciated that a greater or lesser number of pixels could be provided.

It should also be noted that the frame buffer architecture disclosed and described in copending application Ser. No. 7/013,843 would also provide 4 pixels in parallel. It has the extra capability of providing very fast access to an additional three rows of 4 pixels for a total of 4 by 4 or a sixteen pixel square array. Of course, the number of pixels in a row access could be readily changed by changing the number of memory chips and the number of shift register accumulators and appropriate control circuitry as will be readily understood.

Also, it is assumed that the host data bus width is 16 bits. All results can be easily, and in the same manner, extended to a frame buffer built with lower density chips and/or a square access configuration (as mentioned above) and for a different host data bus width.

Figure 3:
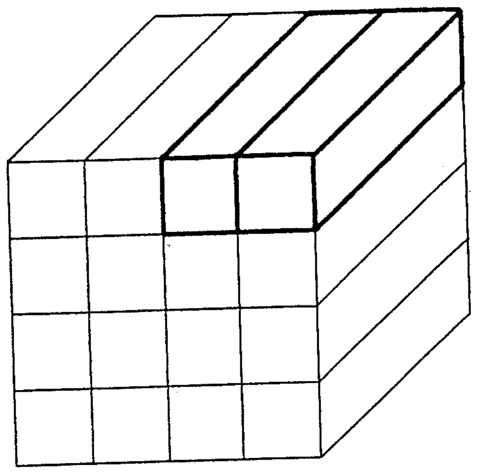
FIGS. 3 thru 6 illustrate four of the possible mappings of a sixteen bit host processor word into a four pixel by four pixel by eight bit array as said pixels would appear on the display screen.
Figure 4:
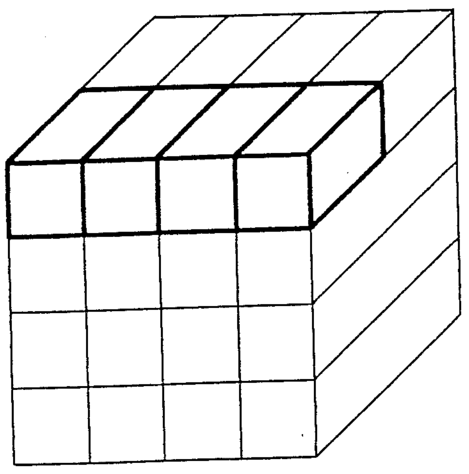
Figure 5:
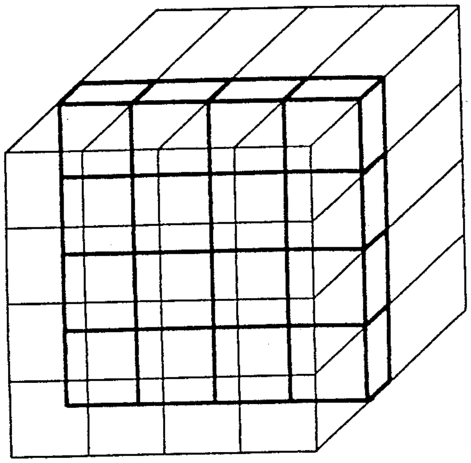

The 16 bit host processor word can be interpreted differently, depending on application. During one memory access cycle, two pixels (FIG. 3), four 4-bit pixel slices (FIG. 4) or 16 bits of the same plane of a 4 by 4 pixel array (FIG. 5) can be updated or read. As a special case of the 16-bit plane update, a 4-bit vector can be written into the frame buffer (FIG. 6) using a masking mechanism. In the present invention, masking is considered as a part of the frame buffer write enable control as described in copending application Ser. No. 7/013,843 and is not considered to be a part of the present data path hardware.

Figure 6:
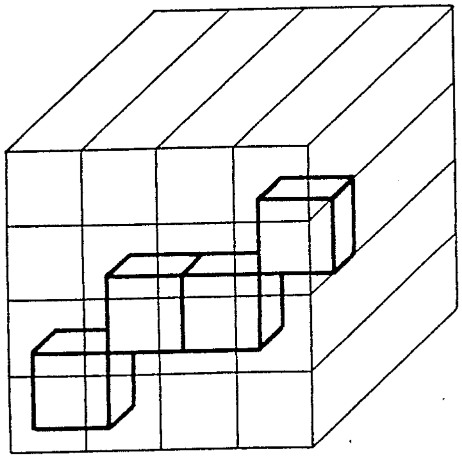
Figure 7:
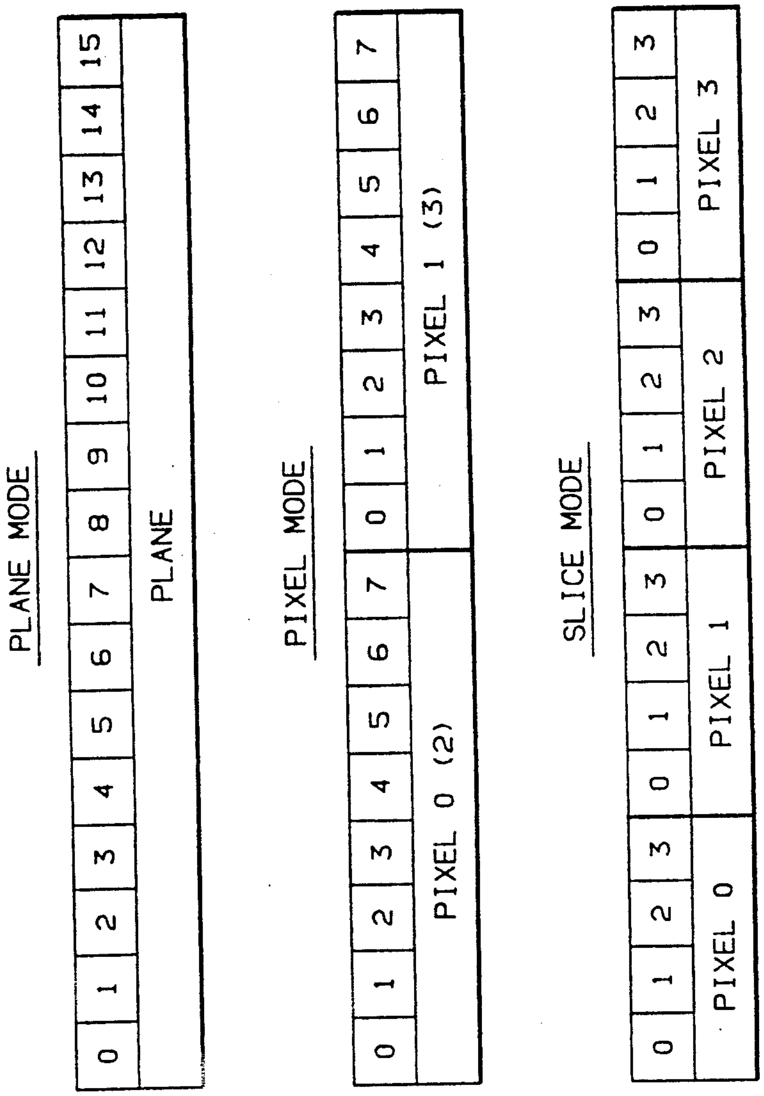
FIG. 7 shows three possible formats of a sixteen bit host processor data word at the pixel data co-processor/host interface.

As shown in FIGS. 3–6, the host processor 16-bit data word would have a different layout or organization for plane, pixel and slice modes (FIG. 7). Two left or two right pixels (of a 4 pixel access) in the pixel mode and lower halves or upper halves of all four pixels in the slice mode can be processed.

Figure 8:
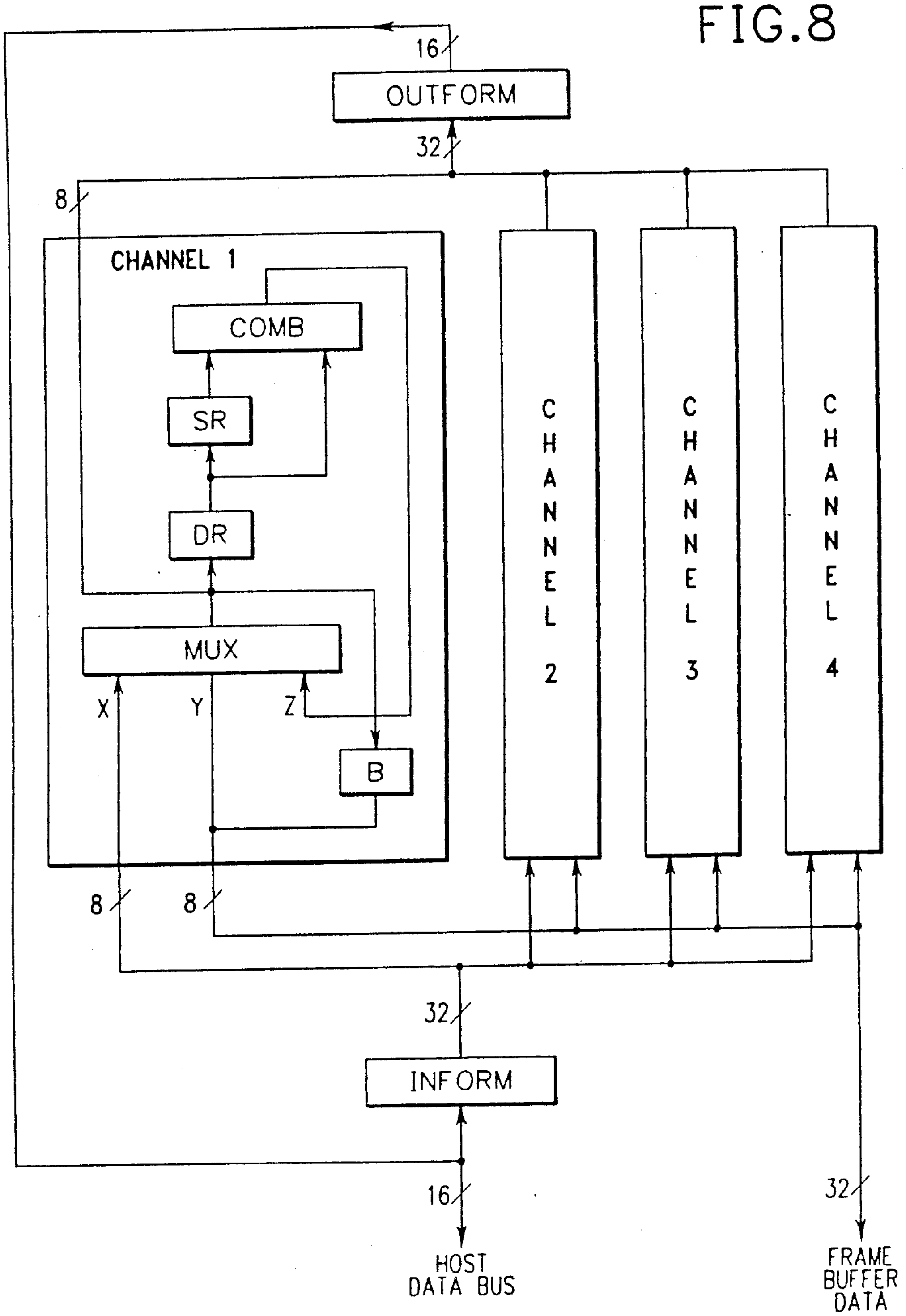
FIG. 8 comprises a functional block diagram of a version of the overall pixel data path co-processor architecture structured primarily for pixel operations.

Based on a 4 pixel linear row access, (i.e., a 4 pixel row access as described in copending Application Ser. No. 7/013,843 the data path architecture may be represented, in the simplest case, as consisting of four channels, each one serving one pixel (FIG. 8). The pixel channel includes a multiplexer MUX, destination register DR, source register SR, a combination unit COMB and a tri-state buffer B.

The 3-to-1 multiplexer MUX allows the DR register to accept either frame buffer data, or host data, or the result of the SR and DR data combination from the COMB unit.

The DR and SR registers serve bit-bit operations, storing frame buffer source and destination data.

The COMB unit provides logic and arithmetic operations on the DR and SR data. The output of the MUX is also connected to the buffer B, supplying update data to the frame buffer I/O bus. The registers SR and DR are pipelined, allowing a number of different bit-blt operations. For example, combination bit-blt can be done for four pixels in parallel and repeatedly for a larger pixel area (e.g., 4 X 4). Also, host data may be transferred into the SR register, and be used as constant source data for clearing a desired area of the frame buffer or as a constant source for copy or combination bit-blt. In the latter case, the SR update must be disabled after the host data is loaded into it.

In order to provide host data rearrangement, two additional units are required: INFORM (the In-Data Formatter) and OUT-FORM (Out-Data Formatter), which are described subsequently. The MUX output is connected to the input of the OUTFORM unit, and the OUTFORM tri-state output and INFORM input are connected to the host bi-directional data bus.

Figure 9:
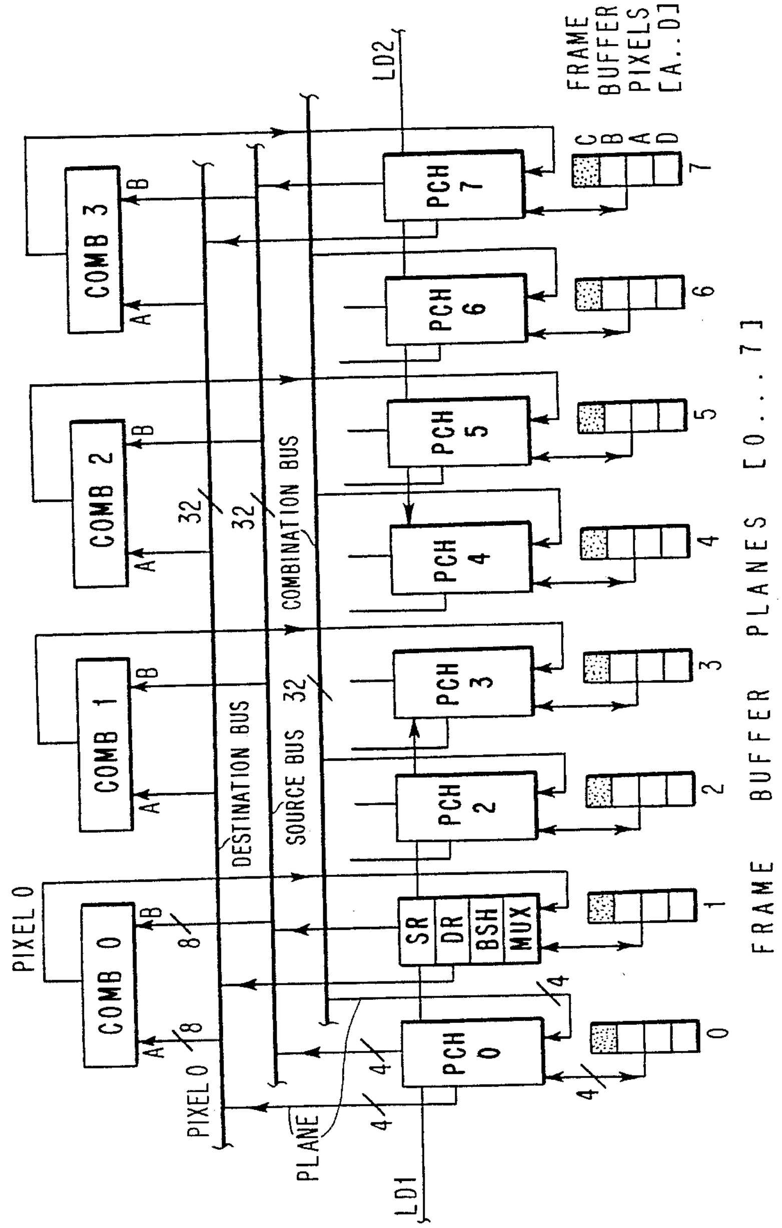
FIG. 9 comprises a functional block diagram similar to FIG. 8 of an alternate embodiment of the pixel data path co-processor (PDC) architecture which is structured to provide for the more versatile processing of either pixel or plane operations.

Each channel of the data path on FIG. 8 has an 8-bit structure, which makes it inconvenient to work with plane-oriented applications but makes it possible to provide a COMB unit with pixel data for pixel-oriented applications. In order to satisfy both kinds of applications, the communication between the frame buffer and pixel data path is preferably implemented not in 'pixel-wise', but in combination 'pixel-plane-wise' manner (FIG. 9).

Instead of four 8-bit pixel channels, the data path consists of eight 4-bit plane channels PLH 0-7 and four 8-bit combination units COMB (0-3).

Figure 10:
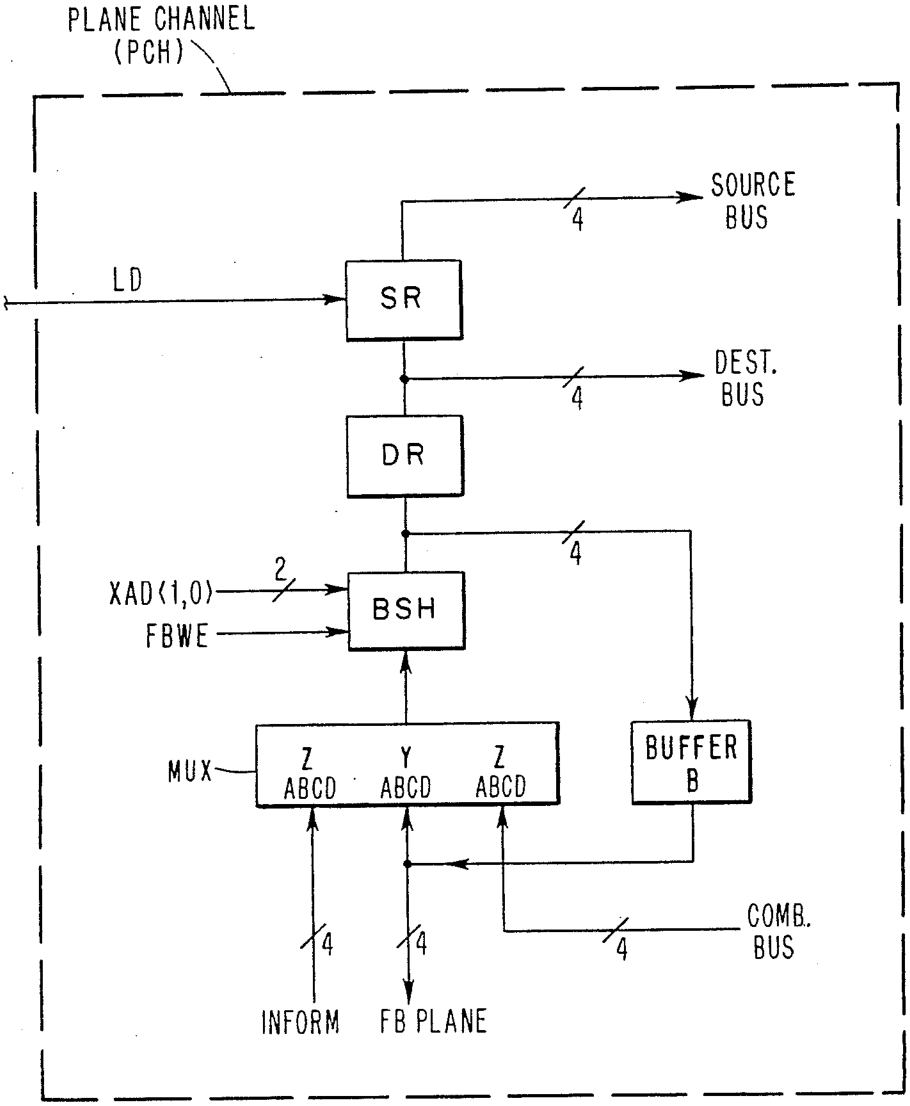
FIG. 10 comprises a functional block diagram of a plane channel (PCH BLOCK) of FIG. 9.

The 4-bit planes 0–7 of the frame buffer, shown in FIG. 2 are connected to corresponding Y inputs of the 4-bit multiplexors, MUX of the plane channels PL HO-7 as shown in FIG. 10. The four bit registers SR and DR of each of the plane channels (PCH) have the same connections with each other and multiplexors MUX as was shown in FIG. 8. But the outputs of the plane channels' DR and SR registers are connected to the four 8-bit combination units COMB in such a way that each of the units is provided with the required pixel data. Accordingly, three internal 32-bit data buses are shown in FIG. 9. The destination bus accepts all outputs of the DR registers, the source bus is connected to the outputs of the SR registers, and the combination bus accepts outputs of the COMB units. Also, in order to control the update of pixel halves, the SR registers in the lower four channels PCH 0-3 are loaded by LD1 signal and the SR registers in the upper four channels PCH4-7 are loaded by LD2 signal.

The COMB 0 A-input takes the eight bits 0 of all of the DR registers, the B-input of the COMB 0 is connected to bits 0 of all of the SR registers, the A-input of the COMB 1 is connected to bits 1 of all of the DR registers, etc. The A inputs of COMB 0 take pixel 0 data from the destination bus. The B inputs of COMB 0 take pixel 0 data from the source bus, etc. COMB 0 A<0>input takes bit 0 of pixel 0 from destination bus COMB 0 B<0>input takes bit 0 of pixel 0 from the source bus, etc.

In turn, the 8-bit COMB outputs are distributed to the corresponding Z inputs of the multiplexors MUX (as shown in FIGS. 9 and 10), in a way that each PCH gets the correct 4-bit plane data. Thus, the eight bits 0 of the Z inputs of the MUX multiplexors in PCH 0-7 are connected to bits 0-7 of the COMB 0 unit, bits 1 of Z inputs are connected to bits 0-7 of the COMB 1 unit, etc.

Accordingly, the result of operations on pixel values is distributed between planes, and planes' data is gathered to provide the combination units with the pixel's data. As a result, for pixel-oriented applications, the COMB units may provide arithmetic or logical operations on pixels in parallel. For plane-oriented operations, logical operations on the corresponding pixel bits deliver the required logical combination operations on planes. Such universalism differentiates the herein disclosed architecture from more conventional data path approaches and allows it to include an antialiasing copy assisting hardware, as shown later.

Another advantage of this structure is that the barrel shifters, which are required for data alignment by the all-point addressable approach, can now easily be installed in the data path and their control becomes elementary.

Eight 4-bit barrel shifters (BSH) are included in the plane channels and have a common control (see FIG. 9), where direction of the shift is controlled by the frame buffer write enable signal (FBWE), and the number of positions to be shifted is defined by the two least significant bits of the horizontal part of the frame buffer address XAD<0,1>. The BSH location, is chosen to be between the MUX and DR register which allows it to be used twice during read (FBWE signal is disabled) and write operations (FBWE signal is enabled), insuring that the frame buffer data alignment is done automatically without any host intervention.

In order to explain the alignment mechanism, the input bits of the MUX are referred to as A,B,C,D for each 4-bit path X,Y,Z which connects the corresponding MUX output bits A,B,C,D to the bits 0-3 of the register DR (FIG. 10). Now, if the frame buffer word is inside the word boundaries, the least significant bits of the horizontal address XAD<1,0>are 0, then the shift number to the barrel shifter BSH is zero, and the bits A of all Y-inputs of the multiplexors MUX will be connected to the left most pixel A (the least significant bit 0 of the pixel A will be connected to the bit A of the input Y of the MUX in the PCH 0, the most significant bit 7 of the pixel A will be connected to the bit A of the MUX in the PCH 7), the bits B of all Y inputs will be connected to the next pixel B, etc. Correspondingly, pixel A data bits 0..7 are connected to the bits 0 of register DR in the channels PCH 0..7, pixel B data bits 0..7 are connected to the bits 1 of registers DR in the channels PCH 0..7, etc.

When the frame buffer word is not inside the word boundaries, e.g., the XAD<1,0>is 0,1, then the pixels A,B,C and D data that is read from the frame buffer feeds the bits B,C,D,A of the multiplexors Y inputs. The barrel shifters shift the MUX outputs one position in the left direction, and the bits 0 of the DR registers again accept pixel A data, bits 1 accept pixel B data, etc.

During the write operation, e.g., writing the output data of combination units back in the frame buffer to the location with XAD<1,0>=0,1, the shift will be one position to the right, providing proper distribution of pixels to the corresponding frame buffer I/O pins.

In other words, pixel alignment is done by equally shifting the eight planes.

Figure 11:
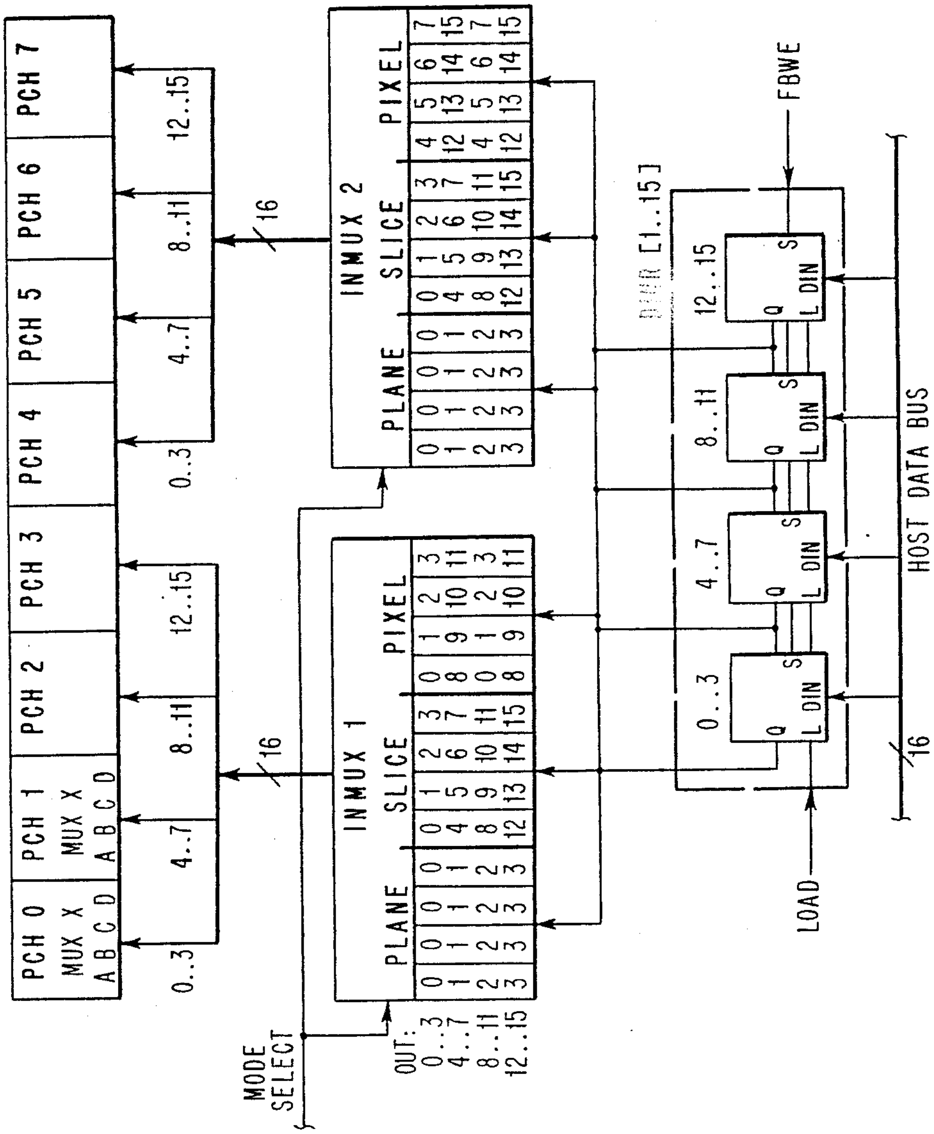
FIG. 11 comprises a functional block diagram of the Data InFormatter (INFORM) block as shown in FIG. 8.

It should be noted that FIG. 11 should be referred to for the purpose of seeing how the various bits and pixels as numbered in FIGS. 2,7 and 12 thru 14 are stored in and passed through the Data In Formatter of FIG. 11. See especially the organization of the bits passing through the two Input Multiplexors (INMUX 1 and 2). As will be apparent to those skilled in the art—the bit designations in the lower portion of the two INMUX unit do not imply storage, but are only intended to show diagrammatically how the organization of the bits constituting the pixels, pixel slices, or planes are organized as they pass through this unit during the three possible operating modes. This figure thus clearly indicates how the overall architecture operates on the host data by keeping track of the various pixels and planes as the data passes into the plane channel logic.

In order to update the frame buffer using host data, it should be loaded into the data-in register DINR of the INFORM unit (FIG. 11). This unit also includes two multiplexors INMUX1 and INMUX2, which distribute host data bits to the proper X input bits of the multiplexors MUX in the plane channels.

Each INMUX multiplexor depending on the 'mode' will accept one of three 16-bit words and passes one of them to the 16-bit output. It consists of sixteen 3-to-1 multiplexors and is controlled by a 3-bit MODE SELECT signal. There are three modes - 'plane', 'slice' and 'pixel', that correspond to the four possible layouts of the host data word (FIG. 7).

The outputs 0..15 of the INMUX multiplexors are connected to the X-inputs of the MUX multiplexors in a way shown in FIG. 6. The outputs 0..15 of the DINR are connected to the six 16-bit inputs of INMUX multiplexors in a particular order, which is also fully illustrated by FIG. 11 by the numbers typed in the INMUX bodies. Particularly, in the 'plane' mode, outputs 0..3 of the INMUX1 or INMUX2 are connected only to the bit 0 of the DINR, outputs 4..7 are connected to the bit 1 of the DINR, etc. In the 'slice' mode, outputs 0..3 are connected to the bits 0..3 of the DINR, and so on. In the 'pixel' mode, bits 0..3 of the INMUX1 output are connected to the bits 0..3 of the DINR, bits 4..7 are connected to the bits 8.11 of the DINR, etc, bits 0..3 of the INMUX2 output are connected to the bits 4..7 of the DINR, etc.

Figure 12:
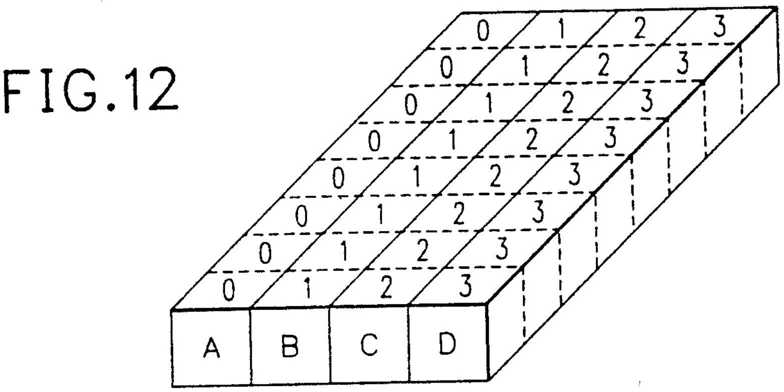
FIGS. 12, 13, and 14 illustrate the three possible input format modes related to the organization of the addressing of the frame buffer.
Figure 13:
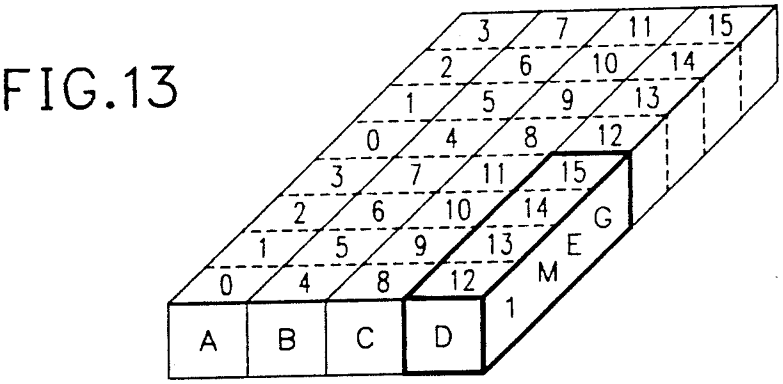
Figure 14:
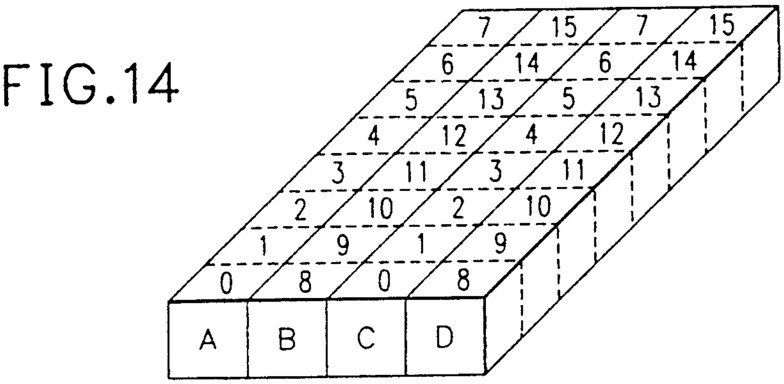

As a result, host data (FIG. 7) is distributed to the pixels and planes as shown in FIGS. 12-14. Now, in the pixel mode, 16-bit data word may be written into the frame buffer pixel locations directly or may be loaded into the DR registers, correspondingly to pairs of pixels A,B and C,D and then be used for updating any pair of pixels. In the 'slice' mode, host data word may be used for updating lower halves of all 4 pixels or upper halves of all 4 pixels. In the plane mode, bits 0..3 may be loaded into any plane of the frame buffer.

In order to avoid the wasting of 12 bits of the DINR when working in the 'plane' mode, this register also has a special structure. In essence, it consists of four 4-bit pipixelined register's (FIG. 11). The host 16-bit data is loaded into the DINR register by signal LOAD making bits 0..3 ready for loading into the frame buffer. After the first write cycle, the tailing edge of the FBWE signal shifts DINR data four position to the left, making next four bits 4..7 ready for frame buffer updating. After the four write cycles, for example, in page mode (writing in horizontal direction) or under Bit-Blt addressing control (in vertical or diagonal direction) all 16 bits of the host data word are written in the frame buffer. The host has additional time to prepare the next word during those four write cycles, so the combination of host DMA mode and Frame buffer page mode may be combined. Also for such a "burst" update, an additional register may be used. It will accept the host data, transfer it to the DINR and while the DINR is used for shifting plane data, this register is free to accept the next data from the host.

It should be mentioned that during the transfer from the DINR to the DR register, the XAD<0,1>should be 0,0, 'disabling' the alignment hardware.

Figure 15:
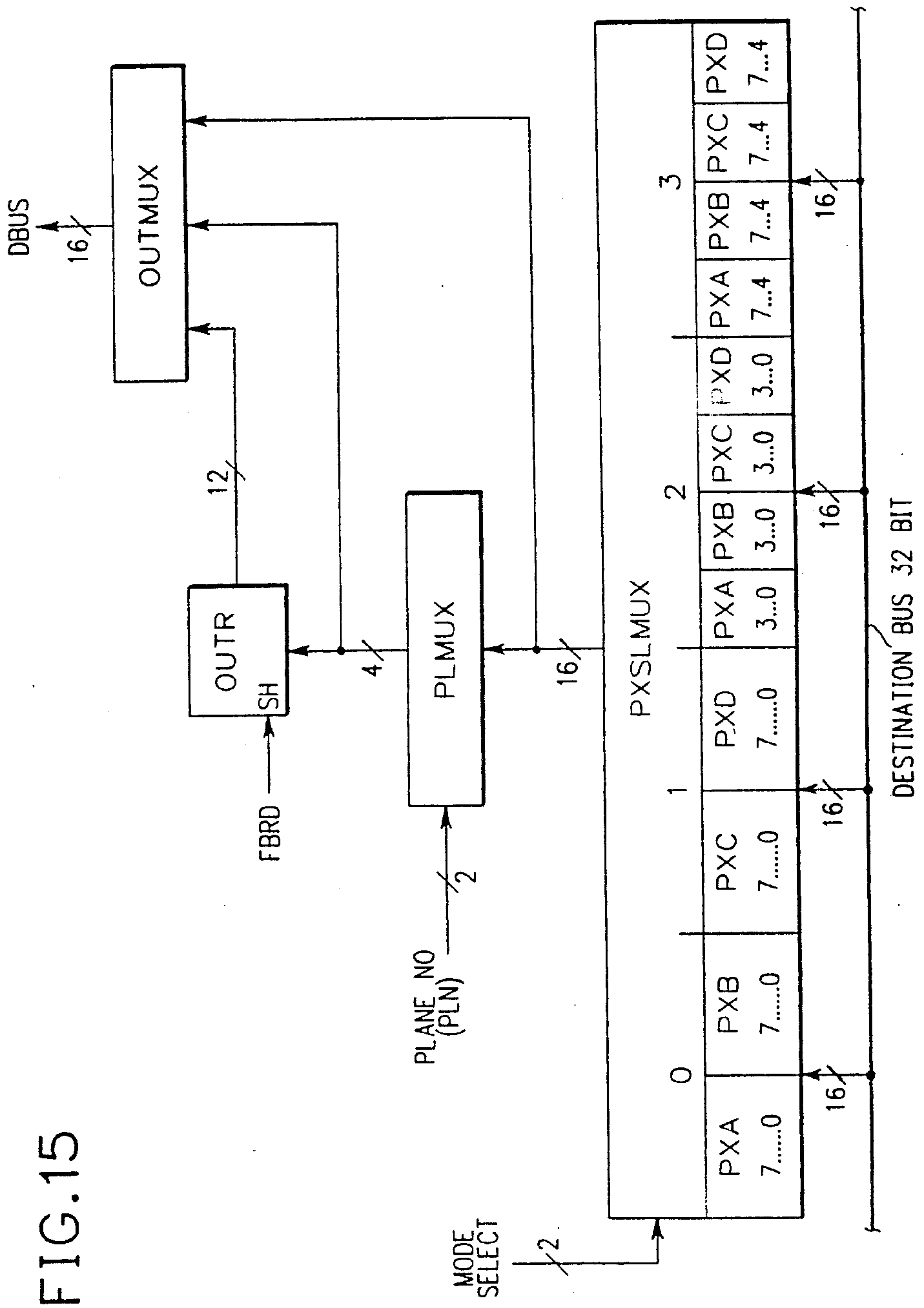
FIG. 15 comprises a functional block diagram of the Data-Out-Formatter block (OUTFORM) of FIG. 8.

The next requirement of the pixel data path is to prepare data that is to be read from the frame buffer for the host data bus. This function is implemented by Data-Out Formatter unit (OUTFORM), shown on FIG. 15. It includes pixel-slice multiplexor PXSLMUX, plane multiplexor PLMUX, a 12-bit register OUTR, and multiplexor OUTMUX. The 64-to-16 PXSLMUX multiplexor provides 16-bit output of the 32-bit destination bus under control of 2-bit MODE CONTROL signal.

In the 'pixel' mode, any pair A,B or C,D of 8-bit pixels is transferred to the inputs of the OUTMUX multiplexor providing the two left most or two right most pixels' data to the OUTMUX inputs. In the 'slice' mode, lower or upper halves of all four pixels are delivered to the OUTMUX inputs.

The 'plane' mode also uses the PXSLMUX in the 'slice' mode, but the halves of four pixels selected by PXSLMUX are used as input data to the 16-to-4 PLMUX multiplexor, which in turn selects a particular plane (one of four planes) under control of the plane number PLN signal. If, for example, plane 5 should be read from the frame buffer, the PSPLMUX provides the upper halves of the pixel data, and the PLMUX delivers four bits of the plane 5 to the OUTMUX.

Again, in order to increase the performance, 16-bit plane data should be provided to the host data bus. The OUTR register serves this purpose. It consists of three pipixelined 4-bit registers, and uses the frame buffer read signal FBRD as a transfer clock. In essence, the OUTR structure is the same as the INDR, but the upper register role is played by the DR. After four memory read cycles, the lower 12 bits will be stored in the OUTR, and the upper four bits will be provided by the DR registers. That 16-bit data from the same plane now is ready to be transferred to the host data bus by the OUTMUX multiplexor.

The last function of the pixel data path is to provide assistance to the color antialiasing copy of graphics objects. It is especially important for high performance typing of high quality text for low and medium cost displays. The subsequent description will refer to a text typing, although it does not depend on the object's shape.

The antialiasing principles are described in an article by Paul N. Sholtz, "MAKING HIGH-QUALITY COLORED IMAGES ON RASTER DISPLAYS", Research Report RC9632, IBM Thomas J. Watson Research Center, Yorktown Heights, N.Y. 1982.

In the general case, pixel data has two fields representing color code and intensity code. The color code on the screen is based on the loading of the video look-up table and does not require any particular distribution of pixel bits between fields. The host processor compares the source and destination pixel intensities and colors and decides what color and intensity codes are to be assigned to the destination.

The idea of the present invention is to make use of the fact that 16 levels of intensity is generally sufficient for practical purposes even for high resolution displays. Thus, dividing pixel data on two equal 4-bit fields, one of each always represents the intensity and another one represents the color codes, 15 colors of antialiasing text can be provided on any particular background color.

For purposes of discussion, the following abbreviations will be used to represent the pixel fields: DC and SC - destination and source color codes, DI and SI - corresponding intensity codes, and MAX/MIN - a one bit control signal which controls whether direct or reverse intensity of the source pixel may be used.

The algorithm for calculating a new destination intensity may be illustrated with the following procedure:

```
If MAX/MIN=1 Then
  Do
    If DC=SC Then DI=MAX(SI,DI)
    Else DI=SI
  End
Else
  Do
    If DC=SC Then DI=MIN(SI,DI)
    Else DI=SI
  End
End
```

The destination color remains the same.

Figure 16:
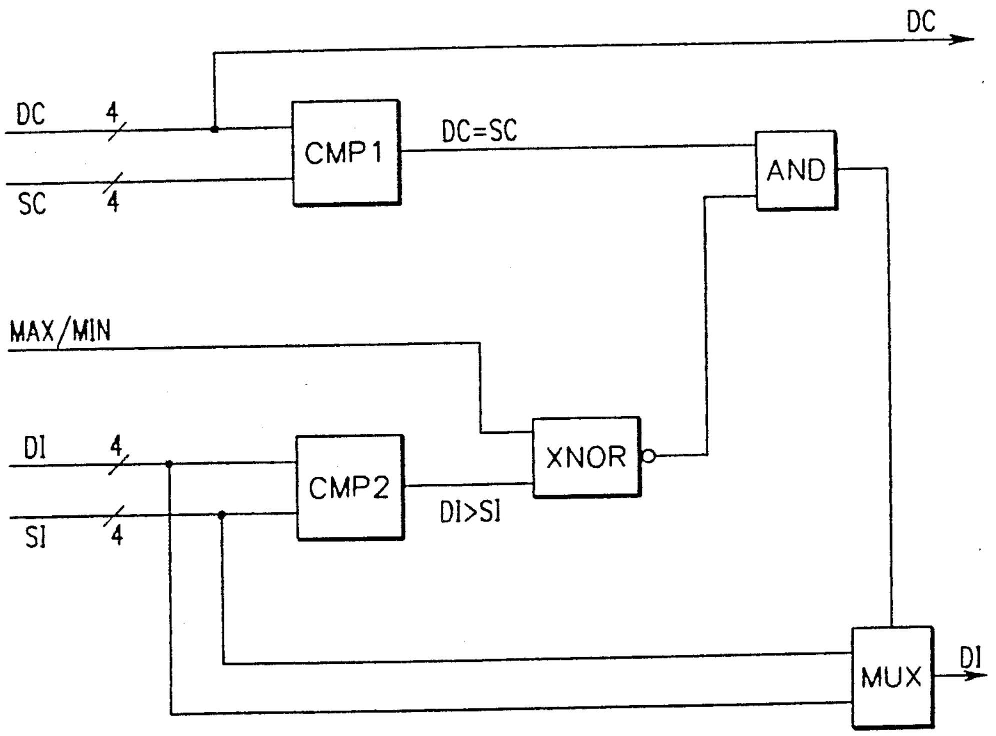
FIG. 16 comprises a functional block diagram of a control circuit which facilitates color antialiasing.

Based on this procedure, the conventional 8-bit arithmetic-logic unit (ALU) which may be incorporated in the COMB unit, should include an additional logic block which is shown on FIG. 16. This addition includes two 4-bit comparators CMP1 and CMP2, XNOR and AND gates, and a 4-bit multiplexor MUX. The output of the MUX provides a new DI value, while DC is derived directly from the input of the logic block as shown.

Now, assuming that the color codes take the upper bits of the pixel values (upper slice) and the intensity codes take the lower values (low slice), the antialiasing copy operation may be described as follows.

As a first step, the host provides the data path with two 16-bit words, representing the first four source pixels color and intensity. The first 16 bit word representing the source color is transferred into the source registers SR bits 4–7 (shown in FIGS. 9 and 10) and following the loading of those registers, the next 16 bit word representing the first 4 pixels intensity values is loaded into the destruction registers DR bits 0–4.

Then the following repetitive process begins, (also incorporating the bit-blt addressing control).

1. The host processor starts a memory read cycle. At the end of this cycle, the source intensity will be loaded into the SR bits 0–3 registers, the destination color and intensity will be located into the DR bits 0–7 registers, and the combination unit calculates the next destination pixel values.
2. The host processor supplies new source intensity values into the DINR and at the same time, initiates a memory write cycle. At the end of this cycle, the frame buffer is updated and new source intensity values are loaded into the DR bits 0–3 registers.
3. The process is repeated unless a new source color value is required.

As a result, only two host cycles are required for typing antialiasing text. Also, the host supplies only 16-bit intensity values, providing parallel update of 32 bits of four destination pixels.

The antialiasing copy is especially important for color displays with a small number of bits per pixel. Of course, the disclosed principles of building the pixel data path are applicable to a longer pixel value. But, for example, in real color systems with 24-bits per pixel, the necessary calculations may be done directly on pixel color values, not color and intensity codes. See, the article by C.J. Evangelisti, L. Lumelsky and P.N. Sholtz, "COPY OPERATION FOR COLOR ANTIALIASING", IBM Technical Disclosure Bulletin, Vol. 27, No. 10B, March 1983, pp. 6234–6236.

In this case, there may be three pixel data path units used in parallel, and color calculations still may be done by COMB units, but using the conventional operation set.

The following is a brief description of an alternative embodiment of the data bus architecture of the present invention. It is shown and described some what more functionally than the previously described embodiment. The essential difference is that additional separate circuitry (e.g., shifters and accumulators) is utilized for pixel and plane operations with somewhat simplified controls. However, essentially the same operation modes are obtainable with both embodiments, i.e., pixel, pixel slice, and plane.

Figure 17:
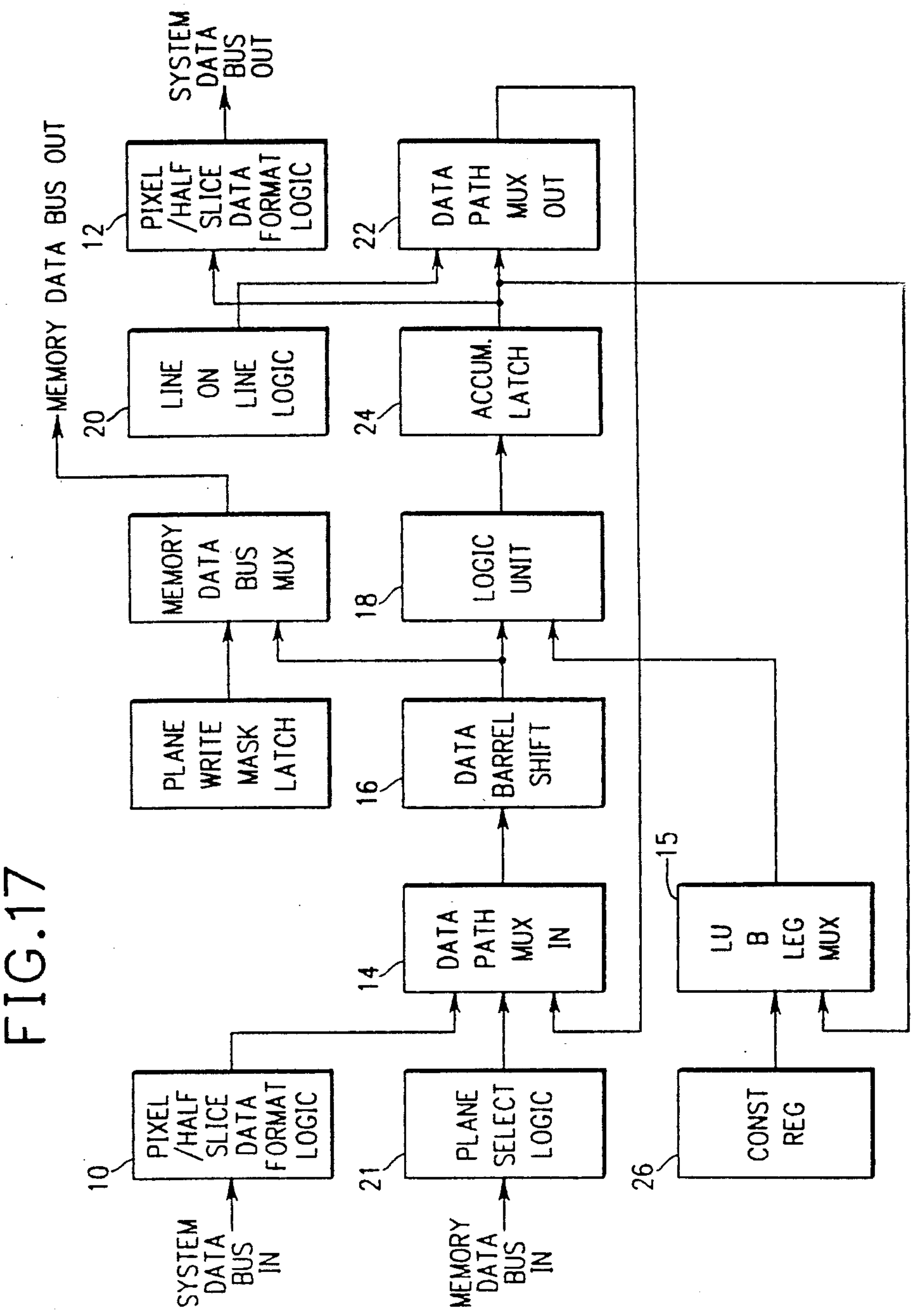
FIG. 17 comprises a functional block diagram of an alternate embodiment of the data path architecture of the present invention which allows both pixel and plane operations, but utilizes separate hardware for each.

Referring now to FIG. 17, the System Data Bus In and System Data Bus Out are connected to the host microprocessor that controls the display subsystem. It is a 16-bit bidirectional bus. Memory Data Bus In and Out are connected to the frame buffer. It is a 32-bit bidirectional bus.

Four different frame buffer memory cycles are run which affect the flow of data through this logic. A memory "read" cycle takes data from the memory data bus, passes this data through the plane select logic, data path MUX in, data barrel shift, logic unit, and stores the data in the ACCUM latch. When this sequence is complete, the system reads the accumulator data, thus completing the read cycle, and the process is completed. A memory "WRITE" cycle takes data from the system data bus, passes this data through the pixel/half slice data format logic, data path MUX in, data barrel shift, logic unit, and stores the data in the ACCUM latch. The frame buffer memory is then cycled, passing the data through both data path MUXIS, the data barrel shift, and out to memory through the memory data bus MUX. A memory "LOAD" cycle is very similar to a "READ" cycle, except that the system does not read data from the ACCUM latch. A memory "STORE" cycle takes data in the accum latch and stores it into the bit map memory in the same manner as the "write" cycle, and again the system is not involved in this cycle. Each part of the data path logic is described below.

A. Pixel/Half Slice Format Logic

Figure 18:
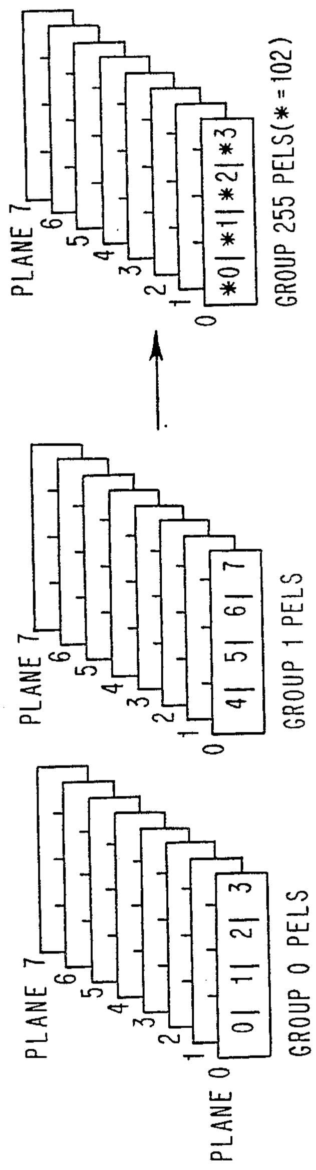
FIG. 18 comprises a drawing which illustrates the nomenclature utilized in the description of the embodiment of FIG. 17.

This logic connects the 16-bit microprocessor bus to the 32 bit data path circuit. The memory organization of the frame buffer is shown in FIG. 18. In this organization, pixels are interleaved in the memory in groups of four. Because each pixel is made up of 8 bits (1 bit per plane of memory) for any memory access, 32 bits of data are controllable. In this implementation, the system is capable of writing to the frame buffer memory in one of two formats. In the "pixel" mode, data can be written to either of the outer pairs of adjacent pixels through all 8 bits.

For example, if pixel 0 is addressed in the pixel mode, a write cycle will map system data bits 15 to 8 into pixel 0 bits 7 to 0 respectively, and system data bits 7 to 0 into pixel 1 bits 7 to 0 respectively. In the "half slice" mode, system data is mapped to all four pixels, either into bits 0 to 3 or 4 to 7 under control of a control bit in the static command register. This same logic is placed on the output side of the ACCUM latch to allow these same format modes to be used when the system reads data loaded into the accumulator from the bit map (a memory "read" cycle).

B. Plane Select Logic

As shown above, the thirty-two bit memory data bus is arranged as four pixels of 8-bit planes per pixel. The data path logic, shown as thirty-two bits, is implemented as 8 four-bit "plane channels". Each plane of data is operated on separately, and merged for output to the bit map memory. The plane select logic is provided for moving data from one selected plane of memory to the "plane channels" of the other planes. It is used, for example, when a mask is stored in one plane to allow the mask data to be logically mixed with data on all other planes.

C. Data Path MUX in Circuit

This circuit provides for multiple sources of data that must flow through the barrel shifter and logic unit circuitry. These sources are, (1) System Data, (2) Frame Buffer Memory Data, (3) Accumulator Data. Since these data sources must each use the barrel shifter and logic unit to allow for unaligned (not along word boundary) data accesses to the frame buffer, it is very beneficial to use this multiplexor approach to save logic over providing each path with a separate barrel shifter and logic unit. There is no performance penality in providing this multiplexing function since only one of these paths can be active for a given memory cycle, and a new path can be specified on each memory cycle.

D. Barrel Shifter Circuit

The barrel shifter circuit is composed of 8 groups of 4-bit barrel shifters. Each 4-bit barrel shifter works on a plane channel. For a read cycle, the barrel shifter is used to align the data that comes from memory before passing it to the logic unit and accumulator. The system then reads the data from the accumulator and the barrel shifter is not involved. For a write cycle, the barrel shifter is set to pass unshifted system data into the logic unit and accumulator. A memory cycle is then initiated and data is passed from the accumulator through the data path multiplexors to the barrel shifter for alignment before being written to the frame buffer. For a load cycle, the barrel shifter is used to align the data that comes from memory before passing it to the logic unit and accumulator. For a store cycle, a memory cycle is initiated and data is passed from the accumulator through the data path multiplexors to the barrel shifter for alignment before being written to the frame buffer.

E. Logic Unit/ACCUM Latch

The logic unit has two input paths, the first is for data coming through the barrel shifter and data path MUX in, the second is from the ACCUM latch. This allows logic operations to be performed on incoming data with data already stored in the accumulator latch. The logic unit is only involved in "read/write" cycles and "load" cycles, it is not involved in the "store" cycle. The logic unit functions include: pass barrel shift data or inverted barrel shift data, pass accum. latch data or inverted ACCUM latch data. Also provided are the following functions of two variables, AND, OR, XOR, NAND, NOR, XNOR of the barrel shift data and the ACCUM latch data.

The accumulator latch is the main latch in the system. This latch holds data coming from the system before being written to the frame buffer. It also holds data read from the frame buffer before passing it to the system. In "load and store" cycles, this latch is used to hold the data as it flows from source to destination within the frame buffer.

F. Line on Line Logic

This logic is designed to allow the detection of lines that are drawn over one another. This is a very useful function in design applications were the user is interacting with a drawing and adding new lines.

The logic consists of 3 registers and a comparison circuit. One register is loaded with the compare color, the second register is loaded with the "hit" color, and the third register is loaded with the "miss" color. In order to use this logic while drawing lines, a load/store cycle must be coded in the instruction queue. As a new line is drawn, data is first loaded into the accumulator and compared on a pixel by pixel basis with the compare color, if a match is found then for that pixel the "hit" color is written by the store cycle, for all the pixels that do not match the compare color, the store cycle writes the "miss" color. To make this function work, the application would load the compare color with the color of the lines they were looking for. When a new line intersects lines of the compare color, a highlighting action will occur in this mode. In addition a register is included in the circuit to enable only selected planes to be used in the comparison of colors. That is, by setting this register to certain values, different planes of memory can be selectively "don't cared" out.

G. Data Path OUTMUX

This logic selects data from the line on line circuit or data from the accumulator latch to be written out to memory.

H. Plane Write Mask Latch/Memory Data Bus MUX

For every memory write cycle this multiplexes the write per bit information and the memory data out to the frame buffer. Using the write per bit feature of the frame buffer allows for selective plane writes to be performed.

I. Constant Register/Logic Unit B Leg MUX

This circuit provides a means for performing logical operations or color expansion on "A leg" data with a constant stored in the constant register. Since the value in the ACCUM latch is destroyed during the logical op, the color is stored in the Constant Reg and the B Leg MUX is set to pass this data to the Logic Unit.

This circuit is designed to streamline the data path operations of a large frame buffer with several unique logic features.

It should be noted that the architecture of the embodiment of FIG. 17 is somewhat different from that of the embodiment of FIGS. 8 and 10, however, the functions performed are substantially co-extensive. The following is a brief listing of the functionally analogous blocks between the two embodiments. The numbered blocks refer to the functional blocks of FIG. 17.

Block 10 is equivalent to the Inform block of FIG. 8. Block 12 is equivalent to the Outform block of FIG. 8. The functions of blocks 14 and 15 are performed by the MUX of FIGS. 8 and 10. Block 16 is equivalent to the BSH (barrel shifter) of FIGS. 8 and 10. The functions of block 18, 20 and 22 are performed essentially by the COMB blocks of FIGS. 8 and 10. Block 24 is equivalent to the DR block of FIGS. 8 and 10. The function of block 26 would be performed by the SR block of FIGS. 8 and 10.

The significant concepts of the present invention are hence incorporated in both embodiments. They both provide a data path architecture having circuitry capable of performing operations on either pixels or planes. As will be appreciated to those skilled in the art this architecture is capable of handling the logical operations used with black/white displays as well as the essentially arithmetic operations used with color displays.

From the preceding detailed description of the first disclosed embodiment and the functional description of the alternate embodiment of the present data path architecture, it will be apparent that a number of changes in the architecture and hardware details is possible without departing from the underlying principles of the present invention.

Both embodiments possess the property of automatically providing the necessary functional capability of aligning the video data for accessing the APA frame buffer with a minimum of interaction from the host system. Other changes in architectural details would also be possible without departing from the spirit and scope of the invention as set forth in the claims.

Having thus described our invention, what we claim as new and desire to secure by Letters Patent is:

1. A multi-channel pixel data path architecture comprising a plurality of functional elements for communication between a host processor and an all-points addressable frame buffer for use in a video raster display adapter, said data path including;

functional element means within said architecture for automatically interconnecting the data path architecture to the frame buffer to selectively provide access to the frame buffer for:

(1) operations on a plurality of pixels, (2) operations on a plurality of pixel slices and, (3) operations on bit planes, functional element means within said architecture for selectively performing both logical and arithmetic operations on video data presented to the data path, functional element means within said architecture for extending bit-blt (bit block transfer) operations comprising the parallel access and processing of multiple contiguous pixels of video data from the frame buffer to provide antialiased text and graphics and, functional element means within said architecture for assisting "burst" mode updating of an arbitrary plane of the frame buffer.

2. In a video adaptor for connecting a raster display type monitor to a host computer system including an I/O (Input/Output) bus, a digital signal processor, a pixel processor and a frame buffer for storing video data to be displayed on the monitor, said frame buffer having all-point-addressable access to M pixels, each having Z-bits of video data, of a row of pixels on the monitor screen which may not be word aligned, in a single memory cycle, the pixel processor has an architecture which comprises a plurality of independently operable functional elements including:

input means for converting video data in a pixel, pixel slice or plane mode format on the host I/O bus to a uniform internal format, means for determining if data to be stored in or accessed from the frame buffer is not aligned along physical word boundaries, and means responsive thereto for automatically aligning and storing same locally, means for selectively performing logical or arithmetic operations on video data stored in said pixel processor and, means for reformatting data processed by said processor into a format suitable for presentation to the host computer system.

3. A video adapter pixel processor architecture as set forth in claim 2 wherein said means for aligning comprises Z selectively actuable separate alignment and storage blocks, each said block including at least one storage register having M bit storage locations therein wherein all of the bits comprising a given pixel are always stored in an identical location in all of said Z storage registers.

4. A video adapter pixel processor architecture as set forth in Claim 3 wherein said means for performing logical or arithmetic operations comprises M arithmetic/logic units (COMBs) selectively connectable to said Z storage registers in a plurality of configurations, means for determining whether a current frame buffer operation requires the writing of a constant at all M pixel locations accessed, a simple bit-blt copy operation comprising the parallel access and processing of multiple contiguous pixels of video data from the frame buffer, or a bit-blt operation with logic and means responsive to said determining means for selecting a required interconnection configuration.

5. A video adapter pixel processor architecture as set forth in claim 4 including a first and second set of storage registers in each of said Z alignment and storage blocks each of said registers having M bit storage locations and means for selectively transferring data from said first and second sets of storage registers in each of said Z blocks to said M arithmetic/logic units as first and second inputs.

6. A video adapter pixel processor architecture as set forth in claim 5 including three internal buses, the outputs of the Z first sets of storage registers connected to a first bus, the outputs of the Z second sets of storage registers connected to a second bus, the two inputs of said arithmetic/logic unit block selectively connectable to said first and second buses and the outputs of said M arithmetic/logic unit blocks being connected to a third bus.

7. A video adapter pixel processor architecture as set forth in claim 6 wherein each of said Z alignment and storage blocks includes an M bit barrel shifter means for determining when data accessed from or to be stored in said frame buffer is not aligned on a physical word boundary, and means responsive to said determining means for causing a shift magnitude decoded from the low order bits of the X address in the frame buffer to be used as a shift control signal for said barrel shifters of the origin of the accessed row of pixels.

8. A video adaptor pixel processor architecture as set forth in claim 7 wherein each of the M (arithmetic/logic units) includes a special antialiasing logic circuit for processing color antialiasing data which includes means for combining color and intensity bit fields of a first and second pixel, said logic circuit comprising means for determining if said two color bit fields are equal, and a first comparator for producing an output in response thereto, a second comparator for determining if a first of said two intensity signals is greater than the other, the output of said second comparator forming one of two inputs to a XNOR circuit the other input being a binary a MIN/MAX signal, the output of said XNOR forming one input to a two input AND circuit, another input being the output of said first comparator, the output of the AND circuit controlling output selection means of a multiplexor whereby the intensity field of said first pixel is set equal to the intensity output field of the logic circuit in response to a determination that the output of the AND is true and the intensity field of the second pixel appears as the output field otherwise, and wherein the color bit field of said first pixel always appears as the color output of the circuit.

9. A video adapter pixel processor architecture as set forth in claim 7 wherein said input means for converting comprises:

interface means for converting data on the host data bus from possible data formats including pixel, pixel slice and plane to a standard internal configuration wherein pixels are stored and may be operated on in a fixed predetermined internal format, said input means further including means for converting data received on the host data bus having a first narrow bandwidth, to a format in which it may be processed internally and transferred to the frame buffer, said format having a substantially wider bandwidth, said input means comprising an input buffer for receiving video data from the host processor and a pair of multiplexors located in the data path between the input buffer and the inputs of the Z alignment and storage blocks in any unit which selectively reconfigures the data stored in the input buffer in accordance with one of three 'mode select signals' which cause the data on the inputs to the multiplexor to be switched to different output lines and wherein the data width of the inputs to and output from the multiplexors is the same.

10. A video adapter pixel processor architecture as set forth in claim 9 wherein said means for reformatting includes a first output multiplexor connected to one of said storage registers via an internal bus, which multiplexor has selective means for connecting subsets of said M pixels or subsets of pixel slices to a second output multiplexor and to a plane select mechanism including means for selecting and connecting specified bit plane data to said second output multiplexors and means in said second output multiplexor to selectively gate pixel, pixel slice, or plane data onto the host data bus.

11. In a video adaptor for connecting a raster display type monitor to a host computer system including an (Input/Output) bus, a digital signal processor, a pixel processor and a frame buffer for storing video data to be displayed on the monitor, said frame buffer having simultaneous all-point-addressable access to M pixels, each pixel having Z bits of video data, of a row of pixels on the monitor screen which may not be word aligned, in a single memory cycle, the pixel processor has an architecture which comprises:

input interface means for converting data on the host I/O bus from possible data formats including pixel, pixel slice and plane to a fixed predetermined internal format, said input means further including means for converting data received on the host data bus having a first narrow bandwidth, to a format having a substantially greater bandwidth in which it may be processed internally and transferred to the frame buffer, means for automatically aligning and temporarily storing, data to be stored in or accessed from the frame buffer which is not aligned along physical word boundaries, said means for aligning including Z selectively actuable separate alignment and storage blocks, each said block including a first and second set of storage registers having M bit storage locations in each register wherein all of the bits comprising a given pixel are always stored in the same location in all of said Z storage registers, and means for selectively transferring data from said first and second sets of storage registers in each of said Z blocks to a set of M arithmetic/logic units as first and second inputs, each of said Z alignment and storage blocks further including an M-bit barrel shifter responsive to means for determining that data accessed from or to be stored in said frame buffer is not aligned on a physical word boundary, and means for causing a shift magnitude decoded from the low order bits of the X address in the frame buffer of the origin of the accessed row of pixels, to be used as a shift control signal for said barrel shifters, means for selectively performing logical or arithmetic operations on selected pixels or pixel planes comprising said set of M arithmetic/logic units (COMBs) selectively connectable to said Z storage registers in a plurality of configurations responsive to means for determining whether a current frame buffer operation requires the writing of a constant at all M pixel locations accessed, a simple bit-blt (bit block transfer) copy operation comprising the parallel access and processing of multiple contiguous pixels of video data from the frame buffer; or a bit-blt operation with logic, three internal buses, the outputs of the Z first sets of storage registers connected to a first bus, the outputs of the Z second sets of storage registers connected to a second bus, two input ports of said arithmetic/logic unit block being selectively connectable to said first and second buses and the outputs of said M arithmetic/logic unit blocks being connected to a third bus, and means for reformatting data processed by said processor into a format suitable for presentation to the host computer system.

12. A video adapter pixel architecture as set forth in claim 11, said input interface means comprising an input buffer for receiving video data from the host computer system and a pair of multiplexors located in a data path between the input buffer and the inputs of the Z alignment and storage blocks which blocks selectively reconfigure the data stored in the input buffer in accordance with one of three 'mode select signals' which cause the data on the inputs to the multiplexor's to be switched to different output lines and wherein the data width of the inputs to and output from the multiplexors is the same.

13. A video pixel processor architecture for interfacing between a host processor and a frame buffer memory of a raster scan display monitor, said pixel processor being adapted to selectively process video data accessed from said frame buffer memory and/or from the host processor, said frame buffer memory being characterized by having the capability of accessing a row of M pixels each having Z bits of video data accessable on an all-point-addressable basis starting at any pixel address on the screen, said pixel processing including:

an input interface unit for converting video data received from the host in pixel, pixel slice, or plane format on a narrow bandwidth data bus into a uniform internal format for presentation to the frame buffer and to other logic and storage circuitry included in said pixel processor, Z plane channel units for storing and aligning at least M bits of video data said data being selectively received from the input interface unit, the frame buffer, or one or more of M arithmetic/logic units in said pixel processor, said M arithmetic/logic units being actuable to selectively perform both logic and arithmetic operations on video data stored in and selectively accessable from said plane channel units, the output of said M arithmetic/logic being selectively transferred to said plane channel units or to the frame buffer, an internal bus structure for interconnecting said Z plane channel units, said M arithmetic/logic units, and an output interface unit, said output interface unit being selectively operable to convert video data stored in said Z plane channel units in the format of Z M bit packets representative of M Z bit pixels to pixel, pixel slice or plane format to a bandwidth and format compatible with the host processor.

14. A video pixel processor architecture as set forth in claim 13 wherein each of said Z plane channel units includes, first and second storage register means having their outputs connected to first and second internal busses, said pixel processor further including:

an M bit barrel shifter for storing a corresponding bit from M pixels, means for selectively presenting a shift signal to said shifter of a magnitude equal to the offset of a current frame buffer pixel row origin address, from a word boundary in said buffer, the output of said barrel shifter being selectively connectable to said first register means or to the frame buffer data bus, the input of said second storage means being selectively connectable to the output of said first storage means and, means for selectively transferring the contents of said first and second storage means to said M arithmetic/logic units via said first and second internal buses.

* * * * *